June 17, 1941. W. H. PRATT 2,246,185
COMBINED METER AND TIMING MOTOR
Filed March 3, 1939 2 Sheets-Sheet 1

Inventor:
William H. Pratt,
by Harry E. Dunham
His Attorney.

June 17, 1941.    W. H. PRATT    2,246,185
COMBINED METER AND TIMING MOTOR
Filed March 3, 1939    2 Sheets-Sheet 2

Inventor:
William H. Pratt,
by Harry E. Dunham
His Attorney.

Patented June 17, 1941

2,246,185

UNITED STATES PATENT OFFICE 2,246,185

COMBINED METER AND TIMING MOTOR

William H. Pratt, Lynn, Mass., assignor to General Electric Company, a corporation of New York Application March 3, 1939, Serial No. 259,606

3 Claims. (Cl. 171—34)

In certain metering applications use is made of a meter and a timing motor. For example, in recording meters a timing motor is employed for advancing the chart and for timing recording operations. In demand meters a timing motor is employed for establishing the demand interval and the operations incident to measuring demand over specified time intervals. In certain metering applications a timing motor is employed for operating a time switch and for changing the metering rate. In such applications it has been the practice to provide a separate timing motor or spring-driven clock. In accordance with my invention the magnetic circuit of the meter is employed as the stator element of the timing motor without interfering with measurement accuracy and at some saving in cost, space and amount of energy used. The features of my invention which are believed to be novel and patentable will be pointed out in the claims appended hereto.

Figure 1:
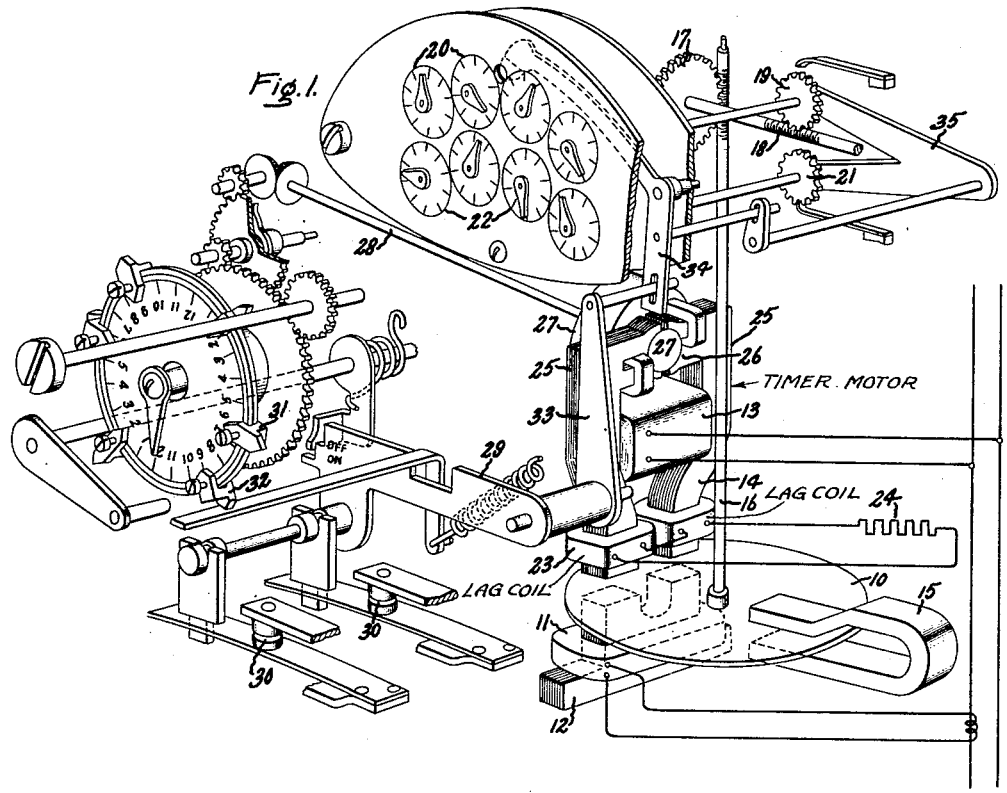
Figure 2:
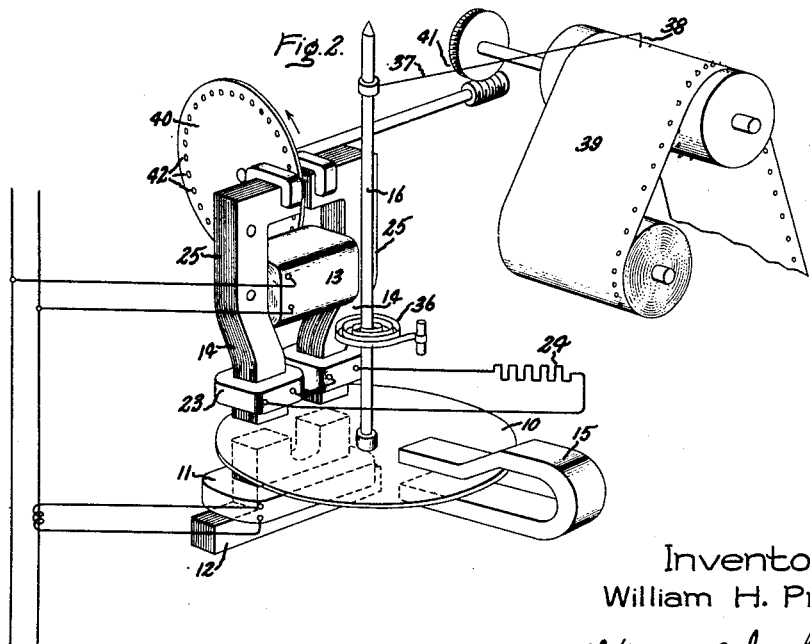
Figure 3:
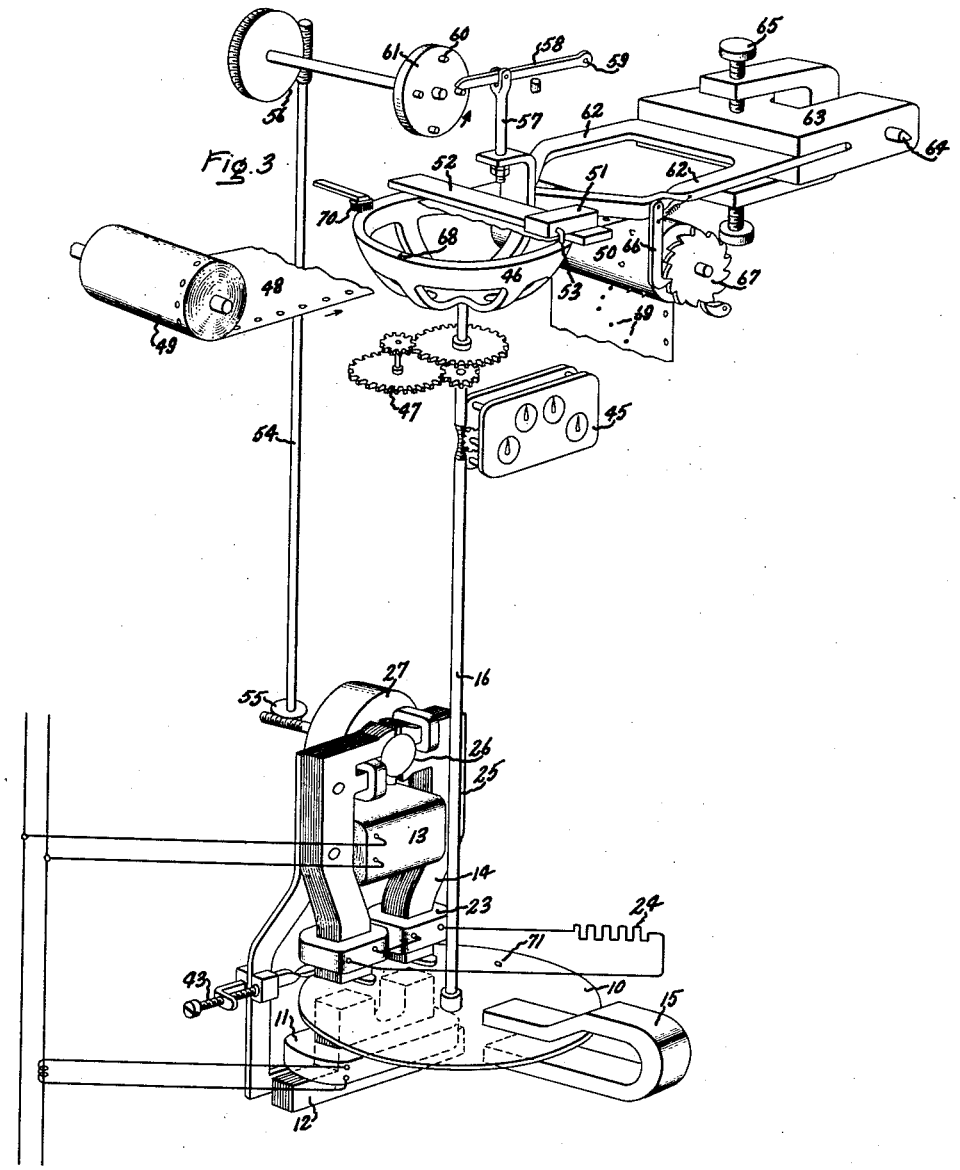
Figure 4:
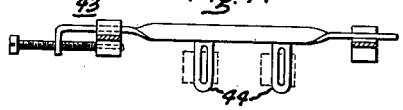

For a better understanding of my invention, reference is made in the following description to be accompanying drawings in which Fig. 1 represents the application of my invention to a multi-rate meter and time switch; Fig. 2 shows the application of my invention to a recording watt-meter; Fig. 3 shows the application of my invention to a recording demand meter, and Fig. 4 is a plan view of a light load adjustment that is used in Fig. 3.

Referring now to Fig. 1, 10 represents the rotary armature disk of conducting material of an induction watt-hour meter. The current coil and core are shown at 11 and 12, respectively. The voltage coil and core are shown at 13 and 14 respectively. 15 is the permanent drag magnet, 16 the meter shaft on which the armature 10 is secured. Shaft 16 drives a gear 17 and worm 18, which worm may be connected to worm gear 19 for driving register 20 at one rate or connected to a worm gear 21 for driving register 22 at a different rate. The watt-hour meter torque principle is the same as that described in my United States Patent 771,932, October 11, 1904. 23 is a phase adjusting secondary winding closed through a resistance 24 to obtain the right phase relation between current and voltage flux.

This meter is combined with a time switch mechanism of the same general character and for the same general purpose as is described in United States Patent 2,132,256 to Cameron, October 4, 1938. However, there is this difference between the present device and the prior art mentioned. Where Cameron provided a separate timing motor for his combination, I make use of the voltage coil 13 of my meter as the primary winding of the timing motor. To this end the core legs of the voltage electromagnet have upward extending branches 25 for directing a portion of the flux produced by coil 13 through pole pieces 26 and the armature gap of a synchronous timing motor. The rotor of this motor is contained in the reduced portion of a casing 27 fitted into the gap between pole pieces 26 and the speed of the motor is suitably reduced by the gearing also contained in the casing and drives a terminal shaft 28 leading to the time switch mechanism. It will be noted that the voltage winding 13 is on the cross-bar of the H-shaped voltage core structure and the flux which is diverted through the upper legs or pole pieces 25 and used solely for operation of the timer motor is diverted symmetrically from the lower legs or pole pieces 14 which are used solely to supply the meter voltage flux. Hence such diversion does not distort or modify the shape of the voltage flux distribution in the meter armature air gap. Except for the common energizing winding and the yoke of the core embraced by such winding 13, the parallel flux paths for the potential fluxes are separate and independent. This is important because it permits of maintaining the existing exacting flux distribution design characteristic of accurate watt-hour meters. Except for the fact that the motor stator is energized by the potential coil 13 of the meter, there is nothing unusual about it and in other respects it may be any one of a number of well-known self-starting synchronous motors.

The main precautions to be taken in thus combining the motor stator and voltage electromagnet is to see that the flux produced by coil 13 is sufficient for both purposes and the division of flux is in the required relation. The fact that coil 13 supplies the motor flux may require a somewhat different adjustment of the phase adjusting resistance 24 than otherwise. This adjustment should be made with the motor in normal operation, since it will normally be in operation when coil 13 is energized. Changes in load on these small motors makes very little change in motor input and does not disturb the potential flux for the meter.

The details of construction and operation of the time switch are immaterial in so far as my invention is concerned. The particular switch mechanism illustrated is described in detail in the Cameron patent above-mentioned. It may be stated that the mechanism raises and lowers a lever 29 to close and open switch contacts at 30 at predetermined times selected by the adjustment of operating cam riders 31 and 32. Lever 29 also operates through levers 33, 34 and 35 and the link connections shown to alternatively shift gears 19 and 21 into and out of mesh with worm 18 to change the registration rate of the meter when the time switch contacts are changed.

It is seen then that by means of my invention I have eliminated the necessity of an extra energizing motor coil and separate motor stator core structure. Some saving in energy may be expected. However, perhaps the most important advantage of the invention is the saving in space and costs incident to the elimination of the extra parts in a device which must be made very compact to meet commercial requirements.

In Fig. 2 I have represented a substantially similar wattmeter element as that described in Fig. 1. However, instead of an integrating meter I have hooked a torsion spring 36 to the shaft so that the meter produces a deflection proportional to the measurement. In Fig. 2 the meter operates a recording arm 37 and a stylus 38 across a recording chart 39 in accordance with the measurement. The synchronous motor shown in Fig. 2 has an armature 40 of the disk type such as is described in U. S. Patent 1,668,365, May 1, 1928, to Hall and is here used to advance the recording chart 39 through the worm gear drive at 41. The disk armature 40 is of conducting material and preferably has a plurality of steel inserts 42 therein which are so spaced as to synchronize the disk at a speed at which the pins pass through the armature air gap in synchronism with the flux pulsations. Such a motor has both induction and sub-synchronous torque. Here the damping magnet 15 has the function of smoothing out rapid movements of the pen and if these fluctuations are not serious, the damping magnet may be omitted.

In Fig. 3 I have represented the integrating type of watt-hour meter such as represented in Fig. 1 coupled with a demand meter recording attachment. At 43 in Fig. 3 and Fig. 4 I show a light load adjusting means which includes conductor loops 44 that may be positioned in the path of the voltage torque flux and adjustable therein to produce the requisite amount of torque in a forward direction to compensate for friction. In Fig. 1 this was not shown and, in many cases where the requirements are not too exacting, may be omitted and the light load adjustment obtained by a slight displacement of the current and voltage core pieces in the proper directions to produce such torque.

The form of demand meter represented in Fig. 1 is fully described in U. S. Patent No. 1,568,704, January 5, 1926 to Warren. 45 is the ordinary watthour meter register for totalizing watthours. Shaft 16 also drives a cup-shaped member 46 through a gear train 47. A recording chart 48 is drawn from a supply roll 49 over a driving drum 50 just above the upper surface of cup 46 and normally out of contact therewith. At periodic intervals a small ink drop is deposited on the rim of cup 46 from an ink dropper 53 of an ink well 51. At the same time an ink drop that was previously deposited on rim 46 and which is assumed to have been rotated beneath the chart 48 is deposited on the chart. In order to accomplish these ink depositing operations at demand measuring intervals, the platform 52 which carries the ink well is momentarily forced downward, bringing the dropper 53 and the chart 48 lightly down against the upper rim of cup member 46. The mechanism for doing this is driven from the synchronous motor 25—27 through shaft 54 and gears at 55 and 56. Extending upward from the platform is a rod 57 pinned to a lever 58. Lever 58 is pivoted at 59 and has its free end in the path of equally spaced pins 60 on a wheel 61 driven by the synchronous motor. Platform 52 is positioned and supported by resilient supporting arms 62 fixed in a support 63 which support is hinged for adjustment at 64 and fixed in adjusted position by bolts 65. When a pin 60 engages lever 58 the platform is first lifted slightly and then allowed to drop, partially by gravity and partially by the spring action of arms 62. The parts are adjusted so that the ink depositing actions are performed without shock and then the platform rises slightly until the next depositing operation. A pawl 66 is also pivoted to arm 62 and held in engaging relation with a ratchet wheel 67 on the end of drum 50. Hence, each time the parts are reciprocated, the chart 48 is advanced. It is seen that if platform 52 is lifted and dropped once every 15 minutes, for example, the distance which an ink drop 68 is carried from the point of deposit at 53 during an interval will be proportional to the integrated measurement of meter armature 10 during such interval and such distance in terms of the measurement will be recorded on chart 48. The nature of the demand records is indicated on the used portion of the chart at 69. A wiper 70 is provided to remove any excess of ink from the rim of cup 46 after the recording operation.

It is seen that the demand time interval and all of the recording and chart-advancing operations are performed by a synchronous motor which receives its energy through the voltage coil 13 of the meter and whose stator laminations 25 are a part of the voltage electromagnet core 14, thus resulting in substantial savings over the use of a separate synchronous motor for such purposes. This double use of the voltage electromagnet in no way interferes with metering operations. The voltage of a circuit is normally nearly constant and there are normally only small changes in the voltage flux, in fact no more change than there would be in the flux of the ordinary timing motor if energized from the metered circuit. The current of the circuit generally changes quite materially and when no current is flowing in the circuit, the meter stops running. Such stoppage, however, does not interfere with the potential flux of the meter or the operation of the motor. The voltage coil 13 may be connected on the supply side or on the load side of the current connection. If on the supply side, the meter will not measure the small current consumption in the voltage coil 13. If on the load side, the meter will measure such consumption when it has additional load but the meter anti-creep device will preferably be adjusted to prevent rotation of the armature 10 if the load is only that of the meter voltage coil. A suitable anti-creep device is provided by means of a small hole 71 in disk armature 10.

Another advantage that might be mentioned is that no extra terminals are necessary for the timing motor. Also, if the meter is disconnected intentionally or due to an unintentional opening of the potential circuit such that the meter stops measuring, its timing motor also stops operating and the recording chart is not wasted. More-over, by its stoppage, the motor indicates that the meter voltage coil is not energized.

Watt or watthour meters have been mentioned in the above explanation, but the invention is not restricted thereto. In fact, any metering device having a voltage magnetic circuit might utilize my invention. In occasional applications the motor herein described as a timing motor might not need to be a synchronous or constant speed motor. Where a separate electric timing motor has heretofore been used in conjunction with electric meters, it has been customary to so space or magnetically shield the motor and meter as to prevent stray fluxes from the motor magnetic circuit from interfering with metering fluxes and measurement accuracy. In my invention the voltage and motor energizing winding are the same and are located between the meter and motor magnetic circuits. The meter is necessarily calibrated with the motor energized in exact proportion to the meter voltage. When so calibrated there can be no subsequent disturbing unintentional change in the phase, magnitude or space relation between the motor and meter voltage fluxes because these relations are fixed by calibration and it is unnecessary to do anything more about the matter. There is no stray motor flux that can be picked up by the voltage coil because the latter is the source of any such flux.

What I claim as new and desire to secure by Letters Patent of the United States is:

1. In combination, an induction meter of the watthour type having current and voltage electromagnets, an electric motor for operating apparatus used in conjunction with said meter, an energizing coil on said voltage electromagnet, a stator for said motor having pole pieces symmetrically magnetically joined to said voltage electromagnet at opposite ends of the energizing winding thereon and providing a flux path for said motor energized by said coil which is otherwise independent of the voltage flux path of said meter.

2. In combination, an electric meter having an H-shaped voltage core and a current core, a rotary armature responsive to the joint action of the fluxes of said cores, a current winding for the current core, a voltage winding on the crossbar of the H-shaped voltage core, the lower legs of said H-shaped core comprising the pole pieces of the voltage core of said meter and an electric motor energized by said voltage winding, the upper legs of said H-shaped core comprising the pole pieces of said motor.

3. An electric metering device having a voltage electro-magnet for furnishing a voltage measurement flux and having a single flux path solely for that purpose, said electro-magnet comprising a U-shaped core part with an energizing winding on the central base portion thereof, a parallel flux path including spaced pole pieces extending from the central base portion of said U-shaped core part on opposite sides of the energizing winding thereon which pole pieces comprise the stator pole pieces for an electric motor and a motor rotor between said pole pieces in said parallel flux path and operated by the flux therein, the motor flux path diverting flux from the measurement flux path symmetrically whereby there is no distortion of the voltage measurement flux by reason of such diversion.

WILLIAM H. PRATT.